US 011907991B2

United States Patent
MacKenzie et al.

(10) Patent No.: US 11,907,991 B2
(45) Date of Patent: Feb. 20, 2024

(54) METHOD AND SYSTEM FOR ITEM LINE ASSIGNMENT

(71) Applicant: Walmart Apollo, LLC, Bentonville, AR (US)

(72) Inventors: Scott MacKenzie, Bentonville, AR (US); Luis Fernando Jover, Bentonville, AR (US); Avinash M. Jade, Bangalore (IN); Mohit Batham, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 1048 days.

(21) Appl. No.: 16/546,967

(22) Filed: Aug. 21, 2019

(65) Prior Publication Data

US 2020/0065876 A1    Feb. 27, 2020

Related U.S. Application Data

(60) Provisional application No. 62/720,272, filed on Aug. 21, 2018.

(51) Int. Cl.
| | |
|---|---|
| *G06Q 30/00* | (2023.01) |
| *G06Q 30/0601* | (2023.01) |
| *G06N 20/10* | (2019.01) |
| *G06F 18/2413* | (2023.01) |

(52) U.S. Cl.
CPC ... *G06Q 30/0627* (2013.01); *G06F 18/24147* (2023.01); *G06N 20/10* (2019.01)

(58) Field of Classification Search
CPC ..... G06Q 30/0627; G06N 20/10; G06K 9/627
See application file for complete search history.

(56) References Cited

U.S. PATENT DOCUMENTS

| | | | |
|---|---|---|---|
| 6,751,600 B1 | 6/2004 | Wolin | |
| 7,647,311 B2 | 1/2010 | Tenorio et al. | |
| 8,234,230 B2 | 7/2012 | Pawar et al. | |
| 8,285,721 B2 * | 10/2012 | Ruvini | G06Q 30/08 705/26.7 |
| 8,484,135 B2 | 7/2013 | Kettner et al. | |

(Continued)

FOREIGN PATENT DOCUMENTS

JP    5391637 B2    1/2014

OTHER PUBLICATIONS

X-Cart 4 Manual (Year: 2009).*

(Continued)

*Primary Examiner* — Matthew E Zimmerman
(74) *Attorney, Agent, or Firm* — Foley IP Law, PLLC

(57) ABSTRACT

Systems and methods for item price assignment. A line recommendation engine receives unassigned records from a queue and stores one or more line recommendations for the unassigned item record in a recommendation database. The line recommendation engine can determine a new line should be recommended, and/or which existing lines the unassigned item record could be assigned to. A user interface can display the one or more line recommendations for the unassigned item record to a user and receive an input indicating a selected line identifier for the unassigned item record. A machine learning engine can modify a parameter of the line recommendation engine based on the selected line identifier.

12 Claims, 8 Drawing Sheets

(56) References Cited

U.S. PATENT DOCUMENTS

| | | |
|---|---|---|
| 9,262,503 B2 | 2/2016 | Hunt et al. |
| 9,613,335 B2 | 4/2017 | Grissom et al. |
| 9,691,075 B1 | 6/2017 | Ray et al. |
| 10,042,895 B1* | 8/2018 | Geva ................ G06F 16/24 |
| 2004/0117253 A1 | 6/2004 | Shacham |
| 2004/0143600 A1* | 7/2004 | Musgrove ........ G06F 16/2455 |
| 2007/0282882 A1* | 12/2007 | Agarwal ........ G06Q 30/0603 |
| 2010/0030668 A1 | 2/2010 | Paben |
| 2010/0332539 A1 | 12/2010 | Moham et al. |
| 2014/0214845 A1 | 7/2014 | Garera et al. |
| 2016/0224996 A1* | 8/2016 | Hunt ................ G06F 16/283 |
| 2016/0379139 A1 | 12/2016 | Eldar et al. |
| 2018/0113934 A1 | 4/2018 | Jablonski |
| 2019/0026770 A1 | 1/2019 | Murugesan et al. |

OTHER PUBLICATIONS

Christen, Peter. "Automatic record linkage using seeded nearest neighbour and support vector machine classification." Proceedings of the 14th ACM SIGKDD international conference on Knowledge discovery and data mining. (Year: 2008).*

Application and Filing Receipt for U.S. Appl. No. 14/214,053, filed Mar. 14, 2014, Inventor(s):Ray et al.

International Search Report and Written Opinion, International Application No. PCT/US2019/047298, dated Oct. 31, 2019, 13 pages.

* cited by examiner

All Items:

| Item | Brand | Size | Color | Line |
|---|---|---|---|---|
| 200380 | Acme | 1 Ea | NA | 1 |
| 200390 | Acme | 1 Ea | NA | 1 |
| 200402 | Acme | 1 Ea | NA | 1 |
| 200414 | Acme | 1 Ea | Black | 1 |
| 201538 | Genco | 1 Ea | Black | 2 |
| 201552 | Genco | 1 Ea | Brown | 2 |
| 201561 | Genco | 1 Ea | Black | 2 |
| 231561 | Globex | 1 Ea | GL BLD | 3 |
| 231561 | Globex | 1 Ea | GL BLD | 3 |

Representative Item Sets:

| Item | Brand | Size | Color | Line |
|---|---|---|---|---|
| 200380 | Acme | 1 Ea | NA | 1 |
| 201538 | Genco | 1 Ea | Black | 2 |
| 231561 | Globex | 1 Ea | GL BLD | 3 |

∎ ∎ ∎

| Item | Brand | Size | Line |
|---|---|---|---|
| 200380 | Acme | 1 Ea | 1 |
| 201538 | Genco | 1 Ea | 2 |
| 231561 | Globex | 1 Ea | 3 |

FIG. 7

METHOD AND SYSTEM FOR ITEM LINE ASSIGNMENT

RELATED APPLICATION

The present application claims the benefit of U.S. Provisional Application No. 62/720,272 filed Aug. 21, 2018, which is incorporated herein by reference in its entirety.

TECHNICAL FIELD

The present disclosure relates generally to the field of pricing systems, and in particular to linking items into line groups.

BACKGROUND

Price is a critical factor influencing shopping behavior. Retailers attempt to earn customer trust by presenting items grouped by attributes and applying consistent prices within such groups. The process of grouping items (which can be products or services) is often referred to as "item linkage." Item linkage methodologies can assign items to lines. Line item grouping leads to consistent pricing of similar items for customers. Many pricing managers perform manual item linkage checks before changing a price for a given item.

Item linkages enable pricing consistency, adherence to business rules, and competitive positioning of items. Following an item linkage process as a discipline can assist with better price management for pricing managers by cutting down on various manual checks before price execution. This can result in better customer experiences.

Item linkage can be based on a variety of business rules. For example, it may be desirable to establish line item groups which are product (and/or service) groups formed by linking items with similar size, brand, cost, packaging type, container type, content type, or other attributes, but having different flavors, model numbers, or other non-group attributes. It can be beneficial for all items within a line item group to have the same retail, or for all items in a group having the same UPC having the same retail, regardless of supplier. It can also be beneficial for items in a line item group to have the same base price across all price markets or have different prices based on markets across same line items Conventionally, pricing managers can leverage replenishment groups to assist in manual item linkage processes. Replenishment groups can be based on previously determined prime items, parent and child items, or other heuristics. These manual methods can be very time-consuming and lack the rigor of a standardized process.

Manual methods have been supplemented somewhat by the use of "rules-based" approaches to item linking. Various pricing or other item management systems enable users to provide a set of item attributes that define a blueprint or footprint of a line. For example, toothpaste lines can be based on dispenser type (tube or pump), size, features, and brand names. These rules-based approaches are limited, however, in that they require users to be aware of attributes that define each line. This can become untenable in complex item categories where hundreds or even thousands of attribute combinations must be considered in order to create line grouping rules.

SUMMARY

Embodiments of the present disclosure provide an automated solution for line item grouping. Embodiments of the present disclosure include systems and methods for product price assignment. An item database comprises a plurality of records for existing items, each record comprising a line identifier and one or more item attributes. Unassigned items can be stored in a queue comprising a plurality of records for unassigned items, which also have attributes.

A line recommendation engine can be configured to receive an unassigned item record from the queue and to store one or more line recommendations for the unassigned item record in a recommendation database. A user interface can display the one or more line recommendations for the unassigned item record to a user and to receive an input indicating a selected line identifier for the unassigned item record. A selection processor can update the item database with the unassigned item record and the selected line identifier. A machine learning engine can modify a parameter of the line recommendation engine based on the selected line identifier.

The line recommendation engine can comprise new line detection engine comprising a single-class support vector model trained with the plurality of records for existing items to determine a blueprint of assignable product attributes. The new line detection engine can be configured to generate a new line recommendation record in the recommendation database when the item attributes of the unassigned item record do not match the blueprint of assignable item attributes.

The line recommendation engine can also include an existing line matching engine comprising a nearest neighbor evaluator configured to generate one or more existing line recommendation records in the recommendation database. Each existing line recommendation can include a line identifier associated with one or more existing item records having item attributes similar to the item attributes of the unassigned product record. The line matching engine can be executed only when no new line is recommended, in other words, when the new line detection engine does not generate the new line recommendation record.

The existing line matching engine can be configured to modify the nearest neighbor evaluator by choosing an appropriate attribute model comprising one or more item attributes from the set of all item attributes in the item database. The attribute model can be chosen by iteratively determining the accuracy of a plurality of candidate models, selecting a training set by randomly selecting one existing item record for each line identifier, randomly selecting a candidate model comprising one or more of item attributes, calculating a distance of each existing item record not in the training set to the item records in the training set based on the candidate model, predicting a line assignment for each existing item record not in the training set based on the candidate model, and determining the accuracy of the candidate model by comparing the predicted line assignment for each existing item record not in the training set to the actual line identifier of the product record. The chosen attribute model can be the candidate model with the highest accuracy.

In embodiments, each product record can further include a price, and wherein product records with the same line identifier are assigned the same price. Each line identifier can be associated with one or more ladder identifiers, and the user interface can request a ladder identifier for each unassigned item record.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures.

FIG. 7 is a chart depicting sample item records, according to an embodiment.

Figure 1:
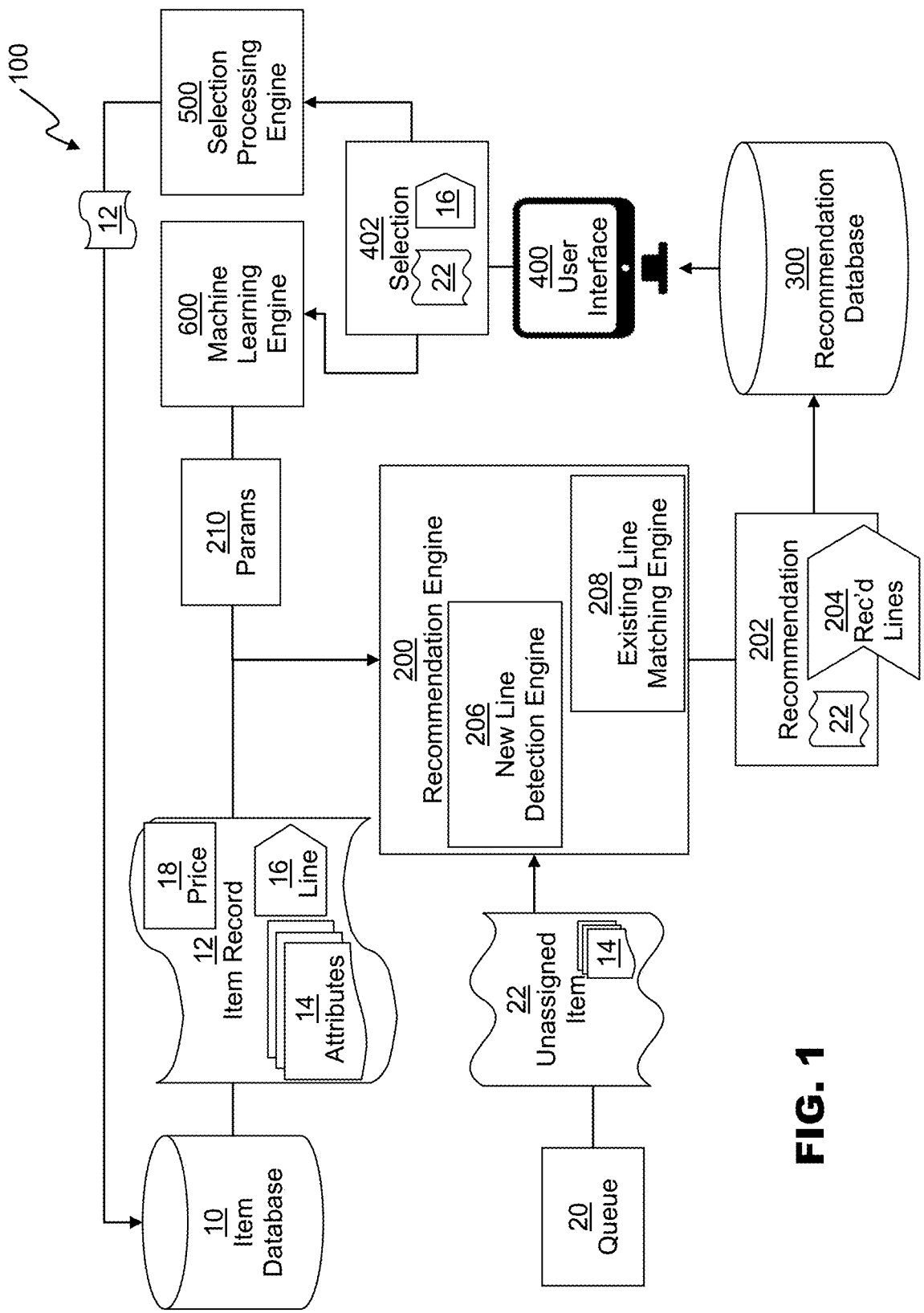
FIG. 1 is a schematic diagram depicting an architecture of a price assignment system, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

FIG. 1 is a schematic view depicting components of an item linking system 100, according to an embodiment. System 100 can be operably coupled to item database 10 and queue 20, or one or both of item database 10 and queue 20 can be components of systems 100. System 100 can comprise recommendation engine 200, recommendation database 300, user interface 400, and selection processing engine 500, and machine learning engine 600.

Item database 10 can be configured to store one or more item records 12. Each item record 12 can comprise one or more item attributes 14 or characteristics, and can include an assignment to an existing line 16. Attributes 14 can be categorical (such as brand name, brand owner name, fineline number/identifier, size description, and the like) or numerical (such as item length, height, width, weight, vendor unit cost, and the like). Item attributes can include a retail price 18. Each item record 12 can provide information and descriptions about an item (which can be one or more physical goods, products, or services) available from a vendor. Vendors can be retailers, wholesalers, manufacturers, or the like. Item records 12 are therefore representations of items, and the terms "item" and "item record" can be used interchangeably herein to refer to data representation(s) of an item. While item record 12 is depicted as including attributes 14 and existing line 16 assignment, those of ordinary skill in the art will recognize that other data format organizations are possible. For example, in embodiments existing lines 16 can comprise a separate data element within item database 10 (or other data store). The items assigned to each existing line 16 can be stored and/or provided as a list including item records 12, or identifiers of item records 12. Item records 12 can further be organized into categories (for example, "Grocery," "Toys," or the like).

Item records 12 can comprise individual records (or rows) in a database table. Attributes 14 can comprise columns in database table. In one embodiment, attribute 14 columns can include: brand owner name, brand family name, vendor name, color description, item length, item height, item width, item cubic measure, item weight, size description, vendor unit cost, fineline number, vendor pack cost, vendor pack quantity, service item time, and service locations. Each item record 12 can include values for all or some of the attributes 14 available. In embodiments, certain attribute values can imply which other attribute columns will also have values.

Queue 20 can comprise one or more unassigned items 22. Each unassigned item 22 can comprise attributes 14 similar to the attributes 14 of item record 12. Queue 20 can be stored within item database 10 or in a separate data store as desired. Unassigned items 22 can be new items, or existing items to be reassigned.

Recommendation engine 200 can receive queue 20, or individual unassigned items 22 from queue 20, and provide recommendations 202. Each recommendation 202 can comprise, link, or associate the unassigned item 22 with one or more recommended lines 16. Recommendations 202 can be stored in recommendation database 300, or other data store for review by a user through user interface 400. Selection processing engine 500 and machine learning engine 600 can receive user selections 402 and update parameters 210 as required.

Each of item database 10, queue 20, recommendation database 300, and other stores of data discussed herein can comprise a database, file system, memory, or other storage system appropriate to store and provide the described data items. Data stores described herein can reside within a single database system or across a plurality of database systems. Database systems used in implementations can include Apache Hadoop, Hadoop Distributed File System (HDFS), Microsoft SQL Server, Oracle, Apache Cassandra, MySQL, MongoDB, MariaDB or the like.

Recommendation engine 200 can comprise new line detection engine 206 and existing line matching engine 208, each of which can receive and/or store one or more parameters 210. Recommendation engine 200 can produce recommendation 202, which can be stored in recommendation database 300, and/or provided to a user or programmatic requester.

Figure 2:
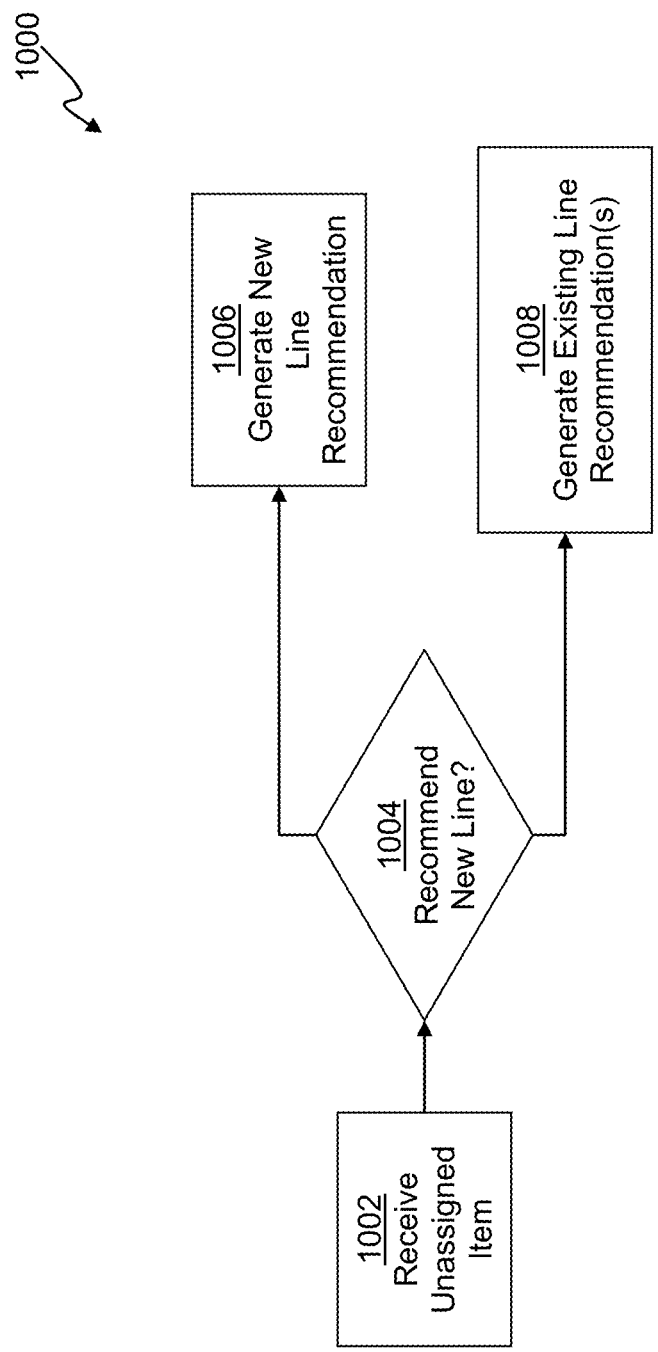
FIG. 2 is a flowchart depicting a method for generating recommendations, according to an embodiment.

FIG. 2 is a flowchart depicting a method 1000 for generating recommendations 202. At 1002 an unassigned item 22 is received. At 1004, the unassigned item 22 can be compared to the universe of existing items 12 to determine if unassigned item 22 will fit into any existing lines 16. In embodiments, each category of existing items 12 can comprise a universe of existing items. If a new line is recommended, at 1006 a recommendation for a new line can be provided. If a new line is not recommended, one or more existing lines 16 can be recommended. In embodiments, each of new line detection engine 206 and/or existing line matching engine 208 can provide a probabilistic result. In one embodiment, recommendations for existing lines can be provided (or calculated) only when the probability of a new line being needed is less than a threshold percentage, for example 60%.

In one embodiment, new line detection engine 206 can comprise a single-class (or one-class) support vector machine (SVM), though other models can be used by embodiments. SVMs, also known as support vector models or support vector networks, are supervised learning models with associated learning algorithms that analyze data used for classification and regression analysis. Conventionally, SVMs receive a set of training examples as input, each training example marked as belonging to one of two categories. SVM training algorithms build an internal model for assigning new examples to one category or the other, as such SVM models are non-probabilistic binary linear classifiers. Ideally, SVM models are representations of the examples as points in a space that are mapped such that the categories are divided by a clear gap that is as wide as possible. The output of such conventional binary classifiers is represented by FIG. 3A.

Figures 3A, 3B:
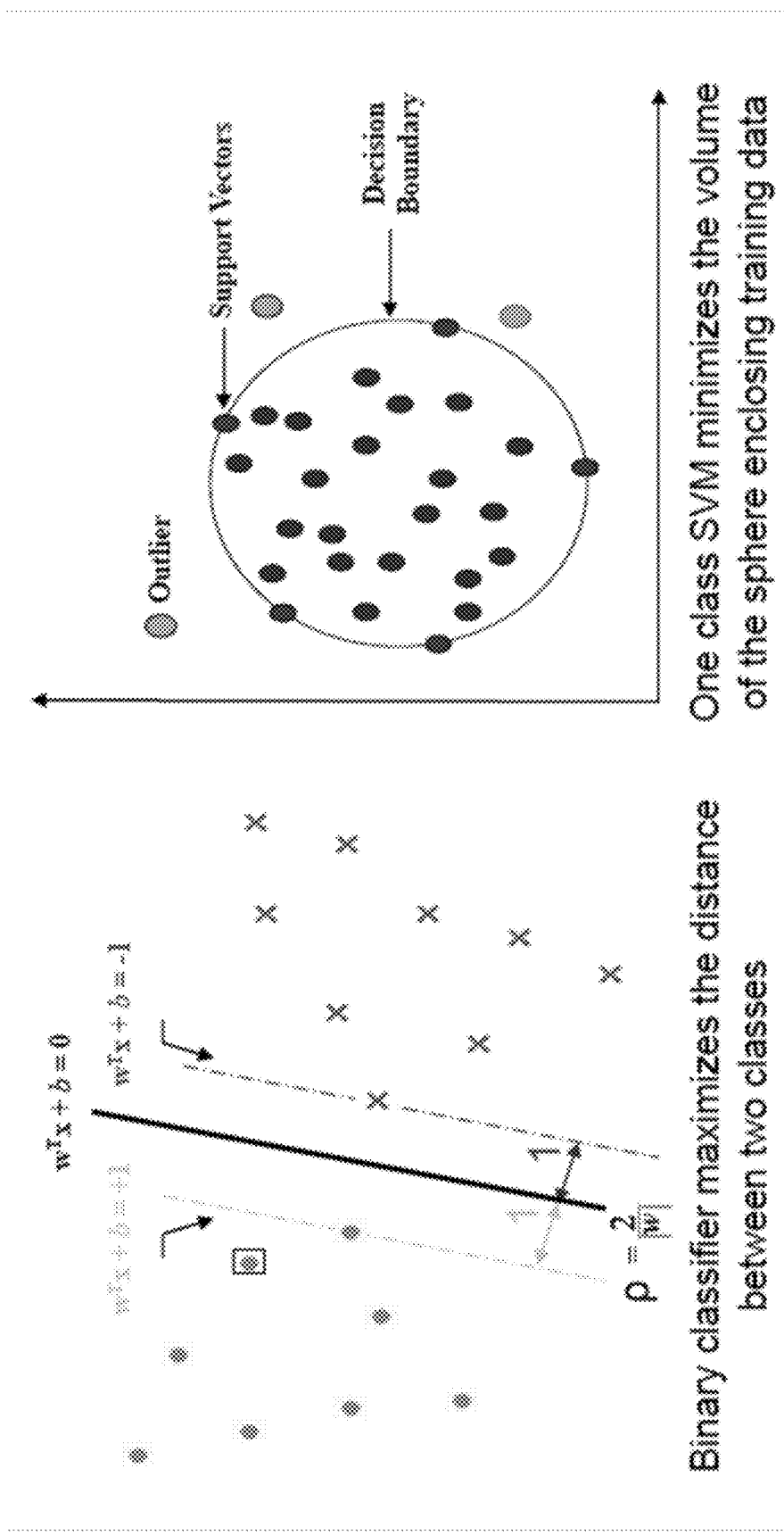
FIG. 3A is a chart depicting a sample binary classifier, according to an embodiment.
FIG. 3B is a chart depicting a sample single class support vector machine, according to an embodiment.

FIG. 3B is a representation of a single-class SVM, according to an embodiment. In single-class SVMs according to the present disclosure, the model is trained on data that has only one class, the "normal" or "existing" class. The SVM can infer the properties of normal cases and from these properties can predict which examples are unlike the normal examples. In other words, the SVM is trained with the plurality of records for existing items to determine a blueprint of assignable item attributes. A new line recommendation can be generated when the item attributes of the unassigned item do not match the determined blueprint.

Figure 4:
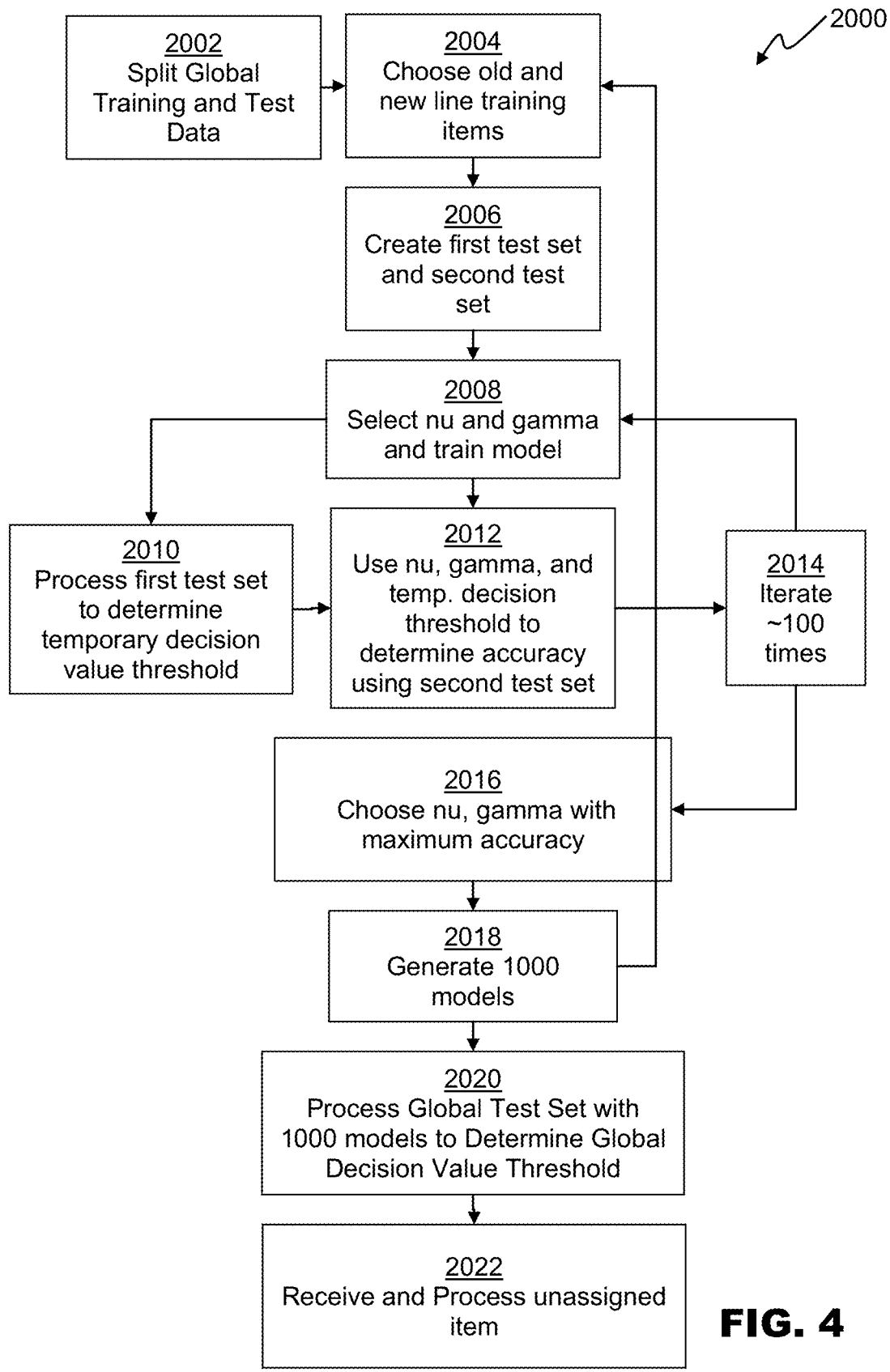
FIG. 4 is a flowchart depicting a method for determining if a new line recommendation should be created, according to an embodiment.

FIG. 4 is a flowchart depicting a method 2000 for determining parameters 210 for an SVM model for determining whether an unassigned item 22 belongs in any existing lines 16. In an embodiment, the single-class SVM takes two parameters as input, nu and gamma (or γ). Nu can be the upper bound on the ratio of margin errors to training examples and a lower bound on the ratio of support vectors to training examples. In other words, where nu is set to 0.05, at most 5% of the training examples will be misclassified, and at least 5% of the training examples will be support vectors. Gamma can define how far the influence of a single training example reaches, with low values meaning "far" and high values meaning "close." The gamma parameter can be seen as the inverse of the radius of influence of samples selected by the model as support vectors. If gamma is too large, the radius of the area of influence of the support vectors only includes the support vector itself and no amount of regularization with nu will be able to prevent overfitting.

Training the model therefore involves determining optimal nu and gamma values based on existing items 12 as well as determining a global decision value threshold. At 2002, the set of existing item records 12 in item database 10 is randomly divided into a training data set and a test data set. In one embodiment, the test data set comprises about ten percent of the existing items records and the training data set can comprise the remaining ninety percent, although other divisions can be used. At 2004, the training data set is further subdivided by choosing a subset of existing lines 16 representing about five percent of the items 12 and labeling them as "new line" items for the purposes of training. Further, another five percent of items are labeled as "old line" items. In embodiments, the size of the various test and training data subsets can be determined based on parameters 210. The goal in training the model can be to choose parameters such that the new line and old line items are identified correctly. At 2006, the old and new line training items are split into a first test set and a second test set. At 2008, the SVM model can be trained for given nu and gamma values and the model can be tested on the first test data set that was created. The SVM model can label any item as new or old based on a decision value for that item and as a result, the accuracy can be calculated based on the number of items that are correctly labeled. At 2010, a temporary decision value threshold can be determined by processing the first test set and determining the accuracy. The threshold for the decision value is chosen to provide the maximum accuracy for the given nu and gamma parameters.

At 2012, the trained model with the chosen nu, gamma, and decision thresholds can be used to label the second test set and the accuracy for that combination of nu and gamma can be determined. At 2014, this process can be repeated with different combinations of nu and gamma. In embodiments, the process can be repeated about one-hundred times with about fifty different combinations. At 2016, the combination with the maximum average accuracy is chosen.

At 2018, the process is iterated about one thousand times, thus generating about one thousand models. At 2020, the global decision value threshold can be calculated by running a large number of iterations of the model with fixed nu and gamma values (about 1000), and using the original test data set as an input. The decision value threshold can be based on the number of iterations that predict the each test item correctly. At 2022, an unassigned item 22 from the queue 20 can be processed by each of the thousand previously generated models, and the final recommendation decision can be based on the labels determined by each iteration and the decision value threshold.

In one embodiment, the formulas used by each SVM model are as follows. The objective of classification of a data domain is that the given set of data should be represented in a unique minimal volume spherical domain enclosing all or nearly all of the training points. The effect of outliers is reduced by using slack variables $\zeta_i$ to allow for data points outside the sphere and the task is to minimize the volume of the sphere and number of data points outside the sphere. The objective function is therefore:

$$F(R, \vec{a}, \zeta_i) = R^2 + C\sum_i \zeta_i \quad i = 1, 2, \ldots, P$$

with constraints:

$$(\vec{x}_i - \vec{a})^T(\vec{x}_i - \vec{a}) \le R^2 + \zeta_i$$

$$\forall \zeta_i \ge 0$$

and where: P is the number of objects in the training set, $$\vec{a}$$

is the center of the sphere and C=1/(P*nu).

The parameter C characterizes the trade-off between the volume of sphere and number of data points that lie outside.

The Lagrangian can be formulated as:

$$L(R, \vec{a}, \alpha_i, \zeta_i) = R^2 + C\sum_i \zeta_i - \sum_i \alpha_i(R^2 + \zeta_i - (\vec{x}_i \cdot \vec{x}_i - 2\vec{a} \cdot \vec{x}_i + \vec{a} \cdot \vec{a})) - \sum_i \gamma_i \zeta_i$$

with Lagrange multipliers: $\alpha_i \ge 0$ & $\gamma_i \ge 0$.

The dot products can be replaced with a kernel, K, such that the dual formulation amounts to the maximization of:

$$L = \sum_i \alpha_i K(\tilde{x}_i, \tilde{x}_i) - \sum_{i,j} \alpha_i \alpha_j K(\tilde{x}_i, \tilde{x}_j)$$

with constraints: $0 \leq \alpha_i \leq C$ and $$\sum_i \alpha_i = 1,$$

and where me kernel function K used is the Gaussian/rbf kernel:

$$K(x_i, x_j) = \exp(-\gamma \|x_i - x_j\|^2)$$

In embodiments, new line detection engine 206 can further recommend a ladder that the new line should be a member of. Ladders can include private brand ladders (versus national brand ladders) and variety ladders. When lines are linked through a ladder, often larger sizes offer a better value than smaller sizes and should have a higher retail than smaller sizes. Each increase in size may offer a better value in unit of measure so that the price tag on the shelf shows at least $0.001 (one tenth of a cent) per unit of measure discount for larger sizes of the same item. Price ladders can vary by product and line; some items gain more efficiency with size than others. Price per unit of a value/bonus pack should be lower than the unit price on the basic side counter item. If a bonus pack size is in the market for more than six months, the bonus pack should become the standard size and the previous standard size should be dropped from the assortment.

When items prices are reduced (for example, for temporary sales) line pricing and price ladders can be enforced across sizes or brands. For example, if a supplier suggests a sale or other promotion on a smaller sized item the merchant may also need to consider the cost of bringing the larger sized items down in price as well in order to maintain the price ladder.

Figure 5:
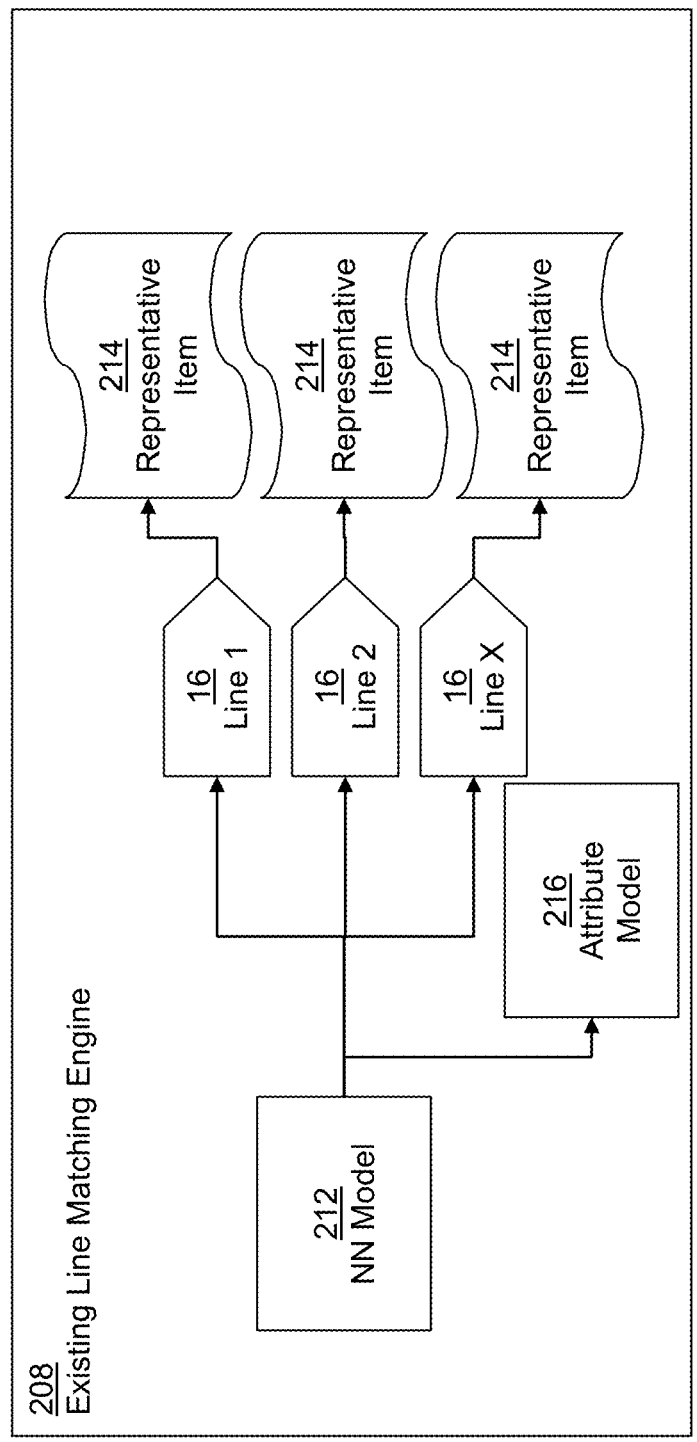
FIG. 5 is a schematic diagram depicting components of an existing line matching engine, according to an embodiment.

FIG. 5 is a schematic view depicting components of existing line matching engine 208 according to an embodiment. Existing line matching engine 208 can use a bootstrapped nearest neighbor model 212 with optimal feature selection. The output of the nearest neighbor model 212 can be a set of representative items 214, one from each existing line 16. Unassigned items can be classified by determining the closest item in the representative set 214 and assigning the unassigned item 22 to the same line based on an attribute model 216 defining the attributes for use in classification.

The distance between two items can be defined as the number of attributes that have different values. Each attribute can be treated as a categorical variable, and items can be considered to have the same value only when there is a perfect match. Other definitions of "distance" can be used in embodiments without changing the overall logic of the model.

Figure 6:
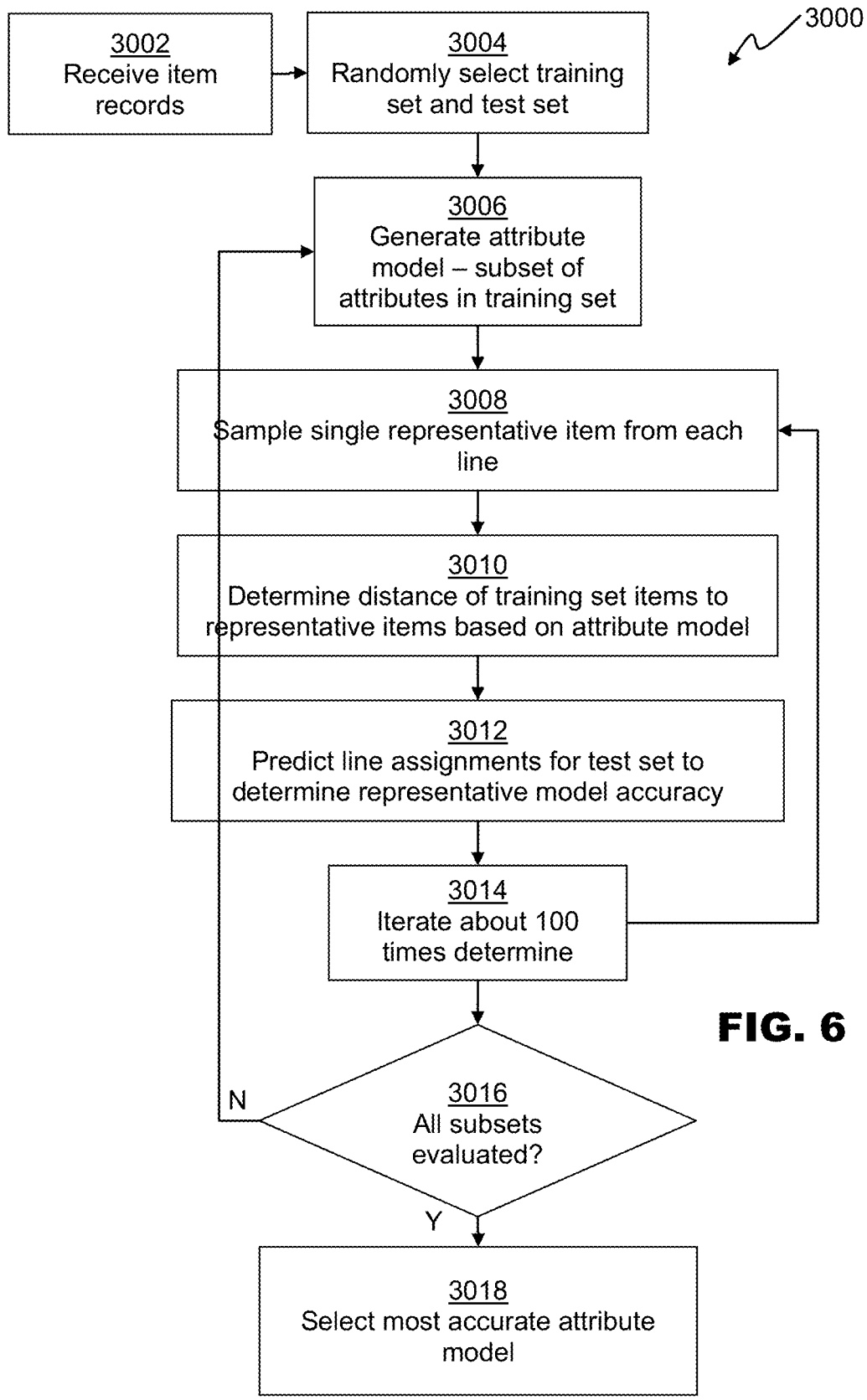
FIG. 6 is a flowchart depicting a method for determining parameters for an attribute model, according to an embodiment.

FIG. 6 is a flowchart depicting a method 3000 for determining one or more existing line recommendations, according to an embodiment. At 3002, item records 12 are received from item database 10, including attributes 14 and lines 16. At 3004, a training set is created by randomly selecting one item record 12 from each line 16. At 3006, an attribute model is generated by selecting a subset of the attributes of the item records 12 in the training set. At 3008, a representative set is created by sampling a single representative from each line in the training set. At 3010, the distance of each item record 12 in the training set to each item in the representative set is calculated based on the current attribute model. At 3012, a line assignment is predicted for each item record 12 in the test set assigning the item record 12 to the same line as the closet item in the training set based on the attribute model. The accuracy of the attribute model is calculated by checking the predicted line assignment against the actual line assignment for each item record 12. At 3014 control returns to 3008 to sample another representative step for about one-hundred iterations to determine an average value for the accuracy of the attribute model. At 3016, if additional subsets remain to be evaluated, control returns to 3006 to generate another attribute model. If not, at 3018, the attribute model with the highest accuracy is selected as the final attribute model 216, which is used to generate existing line recommendations.

In embodiments, additional logic can be used to select the optimal subset of attributes in the final attribute model 216. In general, given a category, some of the attributes may not be useful or may even negatively affect accuracy when classifying items within that category. For example, some attributes may have too many missing values, may have inputting errors, or may not be relevant for a category. To address this issue, the model can start with a given "universe" of attributes selected a priori. This universe represents all the possible attributes that a model can test. For example, in a Food and Consumables category, the attribute universe can consist of 14 different attributes. Within this universe, every possible subset of attributes is selected, and using each subset of attributes the model creates multiple representative item sets as described above. The universe of attributes for each category can be specified in parameters 210. The final attribute model 216 is the one with the highest accuracy out of all the attribute models sets tested. The number of representative item sets created per attribute set can be determined a priori, for example, in parameters 210, with the appreciation that the more representative item sets considered may raise the chance to achieve a better accuracy at the cost of a longer time to run the model.

FIG. 7 is a schematic diagram depicting example data from one category of items, and possible model sets that can be evaluated. In this simplified example, a small universe of only four attributes is considered: brand, size, color, weight. At 3006 above, every possible subset of attributes would be considered, that is: (brand, size, color, weight), (brand, color, weight), (brand, size, weight), etc., resulting in fifteen possible combinations. At 3006, one hundred different representative item sets for each attribute subset can be created, resulting in 1500 different representative item sets. The final attribute model is selected as the one with the highest accuracy. Again, the number of representative item sets per attribute model can be determined taking into consideration the time that it would take to train the model. In one embodiment, fourteen attributes can be considered, resulting in 16,383 different attribute models. If one-hundred representative item sets per attribute model are considered, a total of approximately 1.6 million representative item sets can be evaluated.

After attribute model 216 is selected, unassigned items 22 can be assigned to a line by calculating the distance between the unassigned item 22 and each existing line 16 based on the final attribute model 216.

Figure 8:
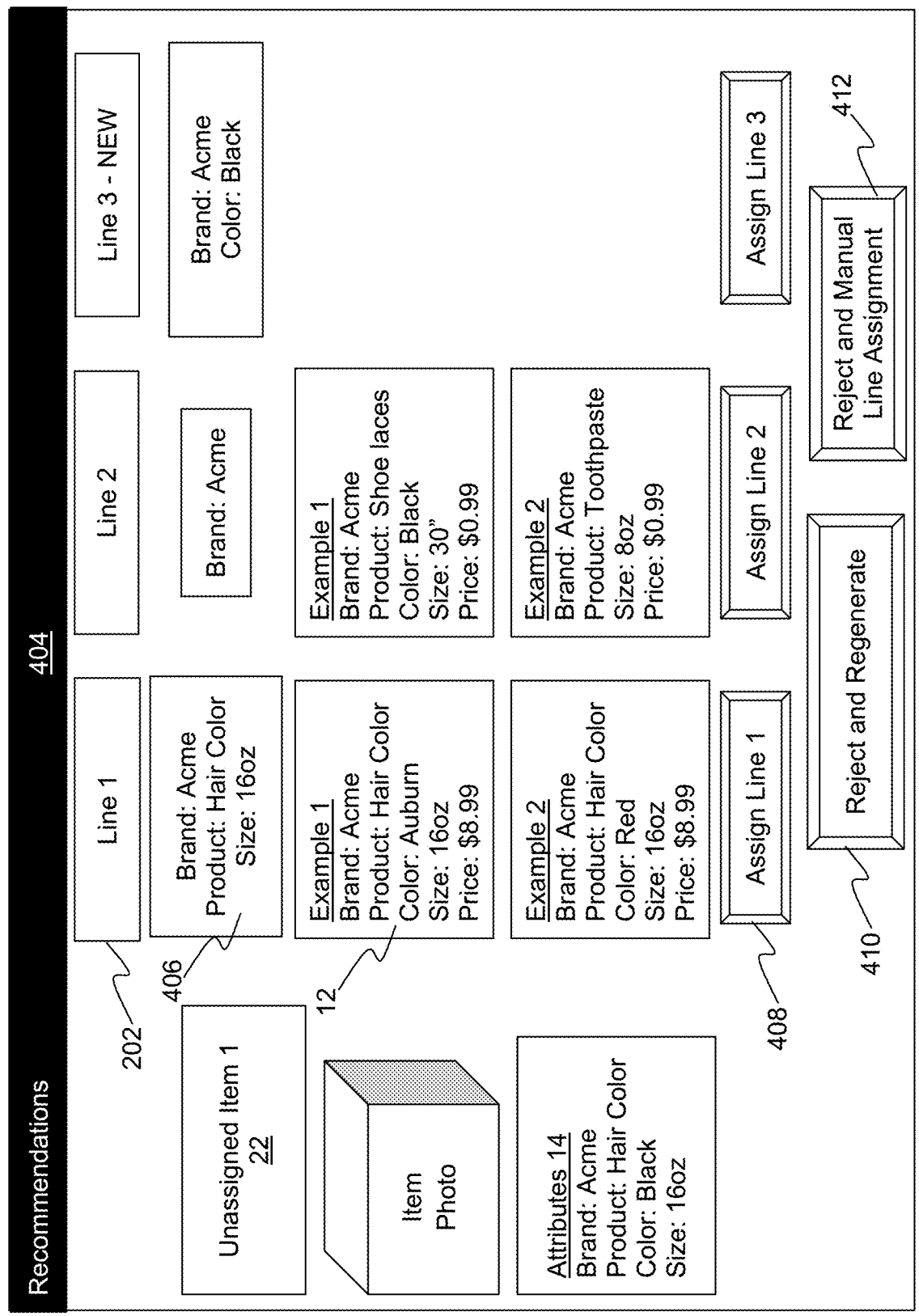
FIG. 8 is a schematic diagram depicting a user interface screen, according to an embodiment.

FIG. 8 depicts a screen 404 of user interface 400 for presenting recommendations and receiving selections 402, according to an embodiment. Screen 404 can present information about an unassigned item 22, including attributes 14. Screen 404 can further present one or more recommendations 202 for line assignments. The presentation of each recommendation 202 can include attributes that were considered in the definition of the line 406, such as the final attribute model 216, and a selection element 408, such as a button, drop down, or other input element enabling the user to select the recommendation for assignment. Screen 404 can further present rejection elements 410 and 412, enabling the user to reject the presented recommendations and either request that the recommendations be regenerated, or to perform a manual line assignment.

The presentation of attribute values of the representative items from the recommended lines can provide transparency for the recommendations that the model is making. This can assist users in understanding the model, and increases user trust in the model's decisions.

As depicted in FIG. 8, presented recommendations 202 can include existing line recommendations, and new line recommendations. While three recommendations are depicted, any number of recommendations can be presented in embodiments, and scrolling, pagination, or user interface elements for presenting multiple data elements can be used. In general, the particular elements and the arrangement thereof depicted in FIG. 8 are presented merely by way of example. User interface 400 can comprise alternate or additional screens 404 configured to enable the user to select a recommended line, or reject the recommendations. Further, screen 404 can comprise controls such as text boxes, radio buttons, check boxes, sliders, buttons, text prompts or any other interface elements enabling a user to input data to be created, updated, stored, or reviewed. User interface elements can be presented on an electronic device such as a computer system, smartphone, or tablet, enabling the user to provide line assignments.

In other embodiments, user interface 400 can present a report, listing, or other output for review by a user without receiving selection input. For example, in embodiments, recommendations 202 can be immediately implemented in item database 10 without explicit user interaction. In still other embodiments, user interface 400 can comprise an application programming interface (API) or other programmatic interface, enable other applications, or systems to interact with system 100 to receive recommendations 202 or provide selections 402.

In embodiments, user interface elements can comprise one or more data files in a markup language such as Hyper Text Markup Language (HTML), or eXtensible Market Language (XML). In embodiments, an XML-based user interface markup language such as User Interface Description Language (UIDL), XML User Interface Language (XUL), or eXtensible Application Markup Language (XAML) can be used.

Returning now to FIG. 1, selection 402 can be a data record comprising an assignment of a line 16 to an item record 12. Selection 402 can be generated by user interface 400 in response to a user selection, including a manual line assignment. Selection processing engine 500 can receive selection 402 and update item database 10 to assign unassigned item 22 to line 16. Unassigned item 22 can be removed from queue 20 after assignment. In addition, selection processor 500 can establish the price 18 of the unassigned item 22 based on the price of items in line 16.

Machine learning engine 600 can further update parameters 210 based on one or more selections 402. Machine learning engine 600 can track a recommendation accuracy score based on selections 402. The recommendation accuracy score can increase when a user selects a recommended line, and decrease when a user rejects the presented recommendations. In embodiments, each recommendation 202 can be ranked, and the recommendation accuracy score can take into account the number of times that users select the top ranked recommendation 202 for an item. Machine learning engine 600 can adjust parameters 210 based on each selection 402 and/or the recommendation accuracy score. The recommendation accuracy score can be presented to the user through user interface 400. The presented scores can be real time, near real time, or historical.

The recommendation score (and other measures) can be determined based on a variety of metrics including the number of unassigned items for which the system has generated recommendations, the number of recommendations accepted by the users, the number of recommendations rejected by the users, and the like.

Embodiments of the present disclosure can enable pricing managers to improve item linking performance and strengthen customer relationships. In embodiments, the disclosed systems and methods can explain the "why" behind the recommended results in terms that people can understand, as opposed to merely a "black box." This can assist pricing managers in becoming confident and knowledgeable in their price groups.

Each of the engines described herein can be executed on demand, on a scheduled basis, or in near real time based on updates in item database 10 or queue 20. In embodiments, the models used by recommendation engine 200 can be regenerated on a regular basis, but recommendations 202 generated only when requested by a user. Machine learning engine 600 can also request a regeneration of one or more models based on a recommendation accuracy score.

In one embodiment, the system 100 and/or its components or subsystems can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain, or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application-specific integrated circuit (ASIC) or field-10 programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

It should be understood that the individual steps used in the methods of the present disclosure may be performed in any order and/or simultaneously, as long as the teaching remains operable. Furthermore, it should be understood that the apparatus and methods of the present teachings can include any number, or all, of the described embodiments, as long as the teaching remains operable.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art.

Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

The invention claimed is:

1. A price assignment system for linking items into line groups comprising:
    an item database comprising a plurality of records for existing items, each record comprising a line identifier and one or more item attributes;
    an unassigned items queue comprising a plurality of records for unassigned items, each record comprising one or more item attributes;
    a line recommendation engine configured to receive an unassigned item record from the queue and to store one or more line recommendations for the unassigned item record in a recommendation database,
        wherein the line recommendation engine comprises a new line detection engine comprising a single-class support vector model trained with the plurality of records for existing items to determine a blueprint of assignable item attributes, the new line detection engine configured to generate a new line recommendation record in the recommendation database when the item attributes of the unassigned item record do not match the blueprint of assignable item attribute, and
        wherein the line recommendation engine further comprises an existing line matching engine comprising a nearest neighbor evaluator configured to generate one or more existing line recommendation records in the recommendation database, each existing line recommendation comprising a line identifier associated with one or more existing item records having item attributes similar to the item attributes of the unassigned item record;

a user interface configured to display the one or more line recommendations for the unassigned item record to a user and to receive an input indicating a selected line identifier for the unassigned item record;

a selection processing engine configured to update the item database with the unassigned item record and the selected line identifier; and a machine learning engine configured to modify a parameter of the line recommendation engine based on the selected line identifier.

2. The system of claim 1, wherein the existing line matching engine generates the one or more existing line recommendations only when the new line detection engine does not generate the new line recommendation record.

3. The system of claim 1, wherein the existing line matching engine is configured to modify the nearest neighbor evaluator by:

iteratively determining the accuracy of a plurality of attribute models, each attribute model comprising one or more item attributes from the set of all item attributes in the item database, by:

selecting a training set by randomly selecting one existing item record for each line identifier, selecting an attribute model comprising one or more of item attributes from the set of all item attributes of all existing item records;

calculating a distance of each existing item record not in the training set to the item records in the training set based on the attribute model, predicting a line assignment for each existing item record not in the training set based on the attribute model, determining the accuracy of the attribute model by comparing the predicted line assignment for each existing item record not in the training set to the actual line identifier of the item record; and modifying the nearest neighbor evaluator to use the attribute model of the plurality of attribute models with the highest accuracy.

4. The system of claim 1, wherein each item record further comprises a price, and wherein item records with the same line identifier are assigned the same price.

5. The system of claim 1, wherein each line identifier is associated with one or more ladder identifiers.

6. The system of claim 5, wherein the user interface is configured to request a ladder identifier for each unassigned item record.

7. A method for linking an item into an item line in an item database comprising a plurality of records for existing items, each record comprising a line identifier and one or more item attributes, the method comprising:

receiving an unassigned item record comprising one or more item attributes;

determining one or more line recommendations for the unassigned item record, wherein determining the one or more line recommendations for the unassigned item record comprises:

training a single-class support vector model with the plurality of records for existing items to determine a blueprint of assignable item attributes;

generating a new line recommendation record in the recommendation database when the item attributes of the unassigned item record do not match the blueprint of assignable item attributes; and executing a nearest neighbor evaluator configured to generate one or more existing line recommendation records in the recommendation database, each existing line recommendation comprising a line identifier associated with one or more existing item records having item attributes similar to the item attributes of the unassigned item record;

storing the one or more line recommendations in a recommendation database;

displaying the one or more line recommendations for the unassigned item record on a user interface;

receiving an input indicating a selected line identifier for the unassigned item record;

updating the item database with the unassigned item record and the selected line identifier; and modifying a parameter of a line recommendation engine based on the selected line identifier.

8. The method of claim 7, wherein the nearest neighbor evaluator is executed only when a new line recommendation record is not generated.

9. The method of claim 7, wherein the nearest neighbor evaluator is configured by:

iteratively determining the accuracy of a plurality of attribute models, each attribute model comprising one or more item attributes from the set of all item attributes in the item database, by:

selecting a training set by randomly selecting one existing item record for each line identifier, selecting an attribute model comprising one or more of item attributes from the set of all item attributes of all existing item records, calculating a distance of each existing item record not in the training set to the item records in the training set based on the attribute model, predicting a line assignment for each existing item record not in the training set based on the attribute model, determining the accuracy of the attribute model by comparing the predicted line assignment for each existing item record not in the training set to the actual line identifier of the item record; and modifying the nearest neighbor evaluator to use the attribute model of the plurality of attribute models with the highest accuracy.

10. The method of claim 7, wherein each item record further comprises a price, and wherein item records having the same line identifier are assigned the same price.

11. The method of claim 7, wherein each line identifier is associated with one or more ladder identifiers.

12. The method of claim 7, further configured to request a ladder identifier for each unassigned product from a user.

* * * * *